Oct. 29, 1963    F. S. FLICK    3,108,661
SHOCK ABSORBER
Filed March 20, 1961    2 Sheets-Sheet 1
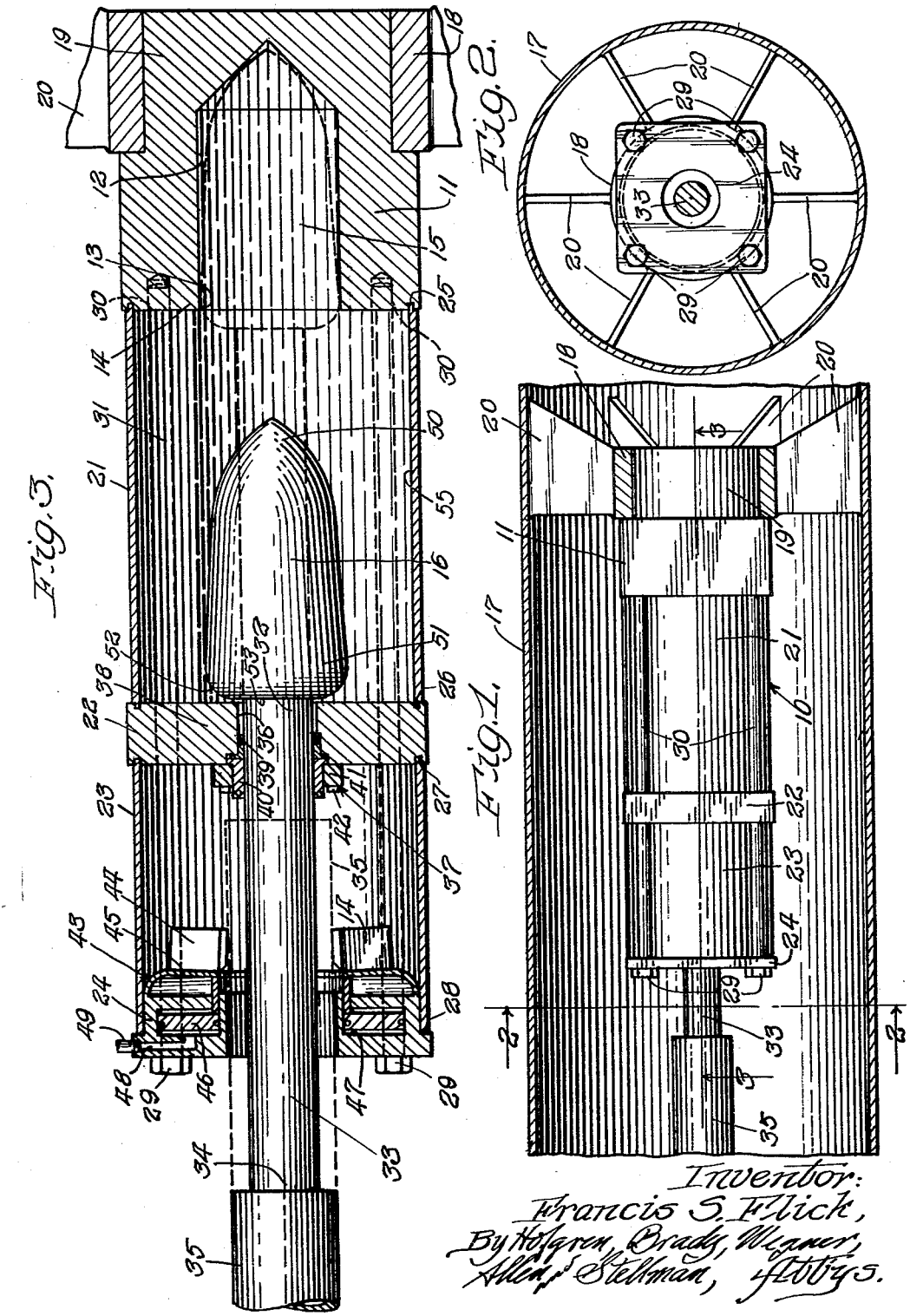
Inventor:
Francis S. Flick,
By Hofgren, Brady, Wegner,
Allen & Stellman, Attys.

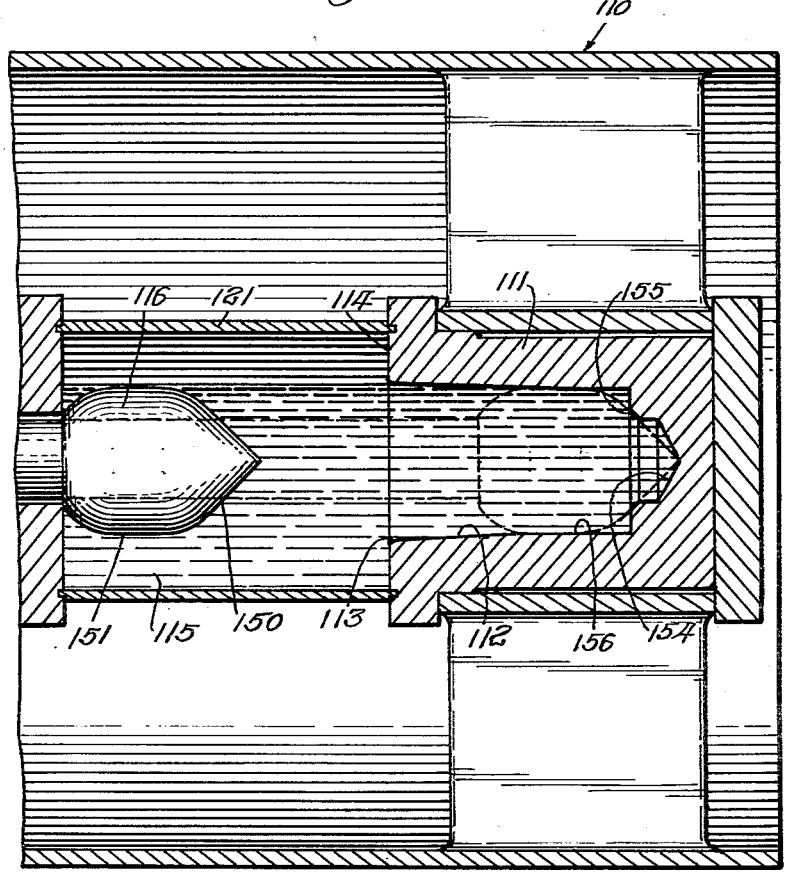

United States Patent Office 3,108,661
Patented Oct. 29, 1963

3,108,661
SHOCK ABSORBER
Francis S. Flick, Oak Park, Ill., assignor to Flick-Reedy Corporation, a corporation of Illinois
Filed Mar. 20, 1961, Ser. No. 97,984
10 Claims. (Cl. 188—94)

This invention relates to shock absorbers and in particular to high speed shock absorbers.

This application comprises a continuation-in-part of my copending application for a shock absorber, Serial No. 70,316 filed November 18, 1960 and now abandoned.

In certain applications, such as fast-acting, self-closing air vents, it is necessary to provide shock absorber means capable of withstanding extremely high forces in extremely short periods of time. Illustratively, in such self-closing air vents, decelerations in the order of 800 g.'s may be required to be absorbed within periods of time in the order of .01 second. The conventional shock absorbers provided for such high speed, high force applications have a number of serious disadvantages precluding fully satisfactory operation. Thus, the known shock absorbers have utilized means for trapping the shock absorbing fluid and then metering the trap fluid through suitable orifice holes to associated reservoirs. Alternatively, the delivery of the trap fluid may be controlled by suitable relief valves. Such structures are relatively costly and susceptible to malfunctioning.

Another problem encountered in the known shock absorber structures is the requirement of the provision of high pressure seals which, similarly, are relatively costly and susceptible to malfunctioning. Further, in the known high speed shock absorbers, a substantial excessive turbulence is produced in the shock absorber fluid during the operation thereof which may cause substantial variation in the operational characteristics thereof. Still further, where fast free travel is required, prior to deceleration, the present shock absorbers conventionally include separable members with the moving members striking the shock absorbing member at high speed and causing extreme shock and acceleration loads due to the inertia of the stationary parts.

The present invention comprehends a new and improved high speed shock absorber eliminating the above discussed disadvantages of the known high speed shock absorbers. Thus, a primary object of the present invention is to provide a new and improved shock absorber.

Another object is to provide such a shock absorber arranged for high speed operation having a simple and economical structure.

A further object is to provide such a shock absorber obviating the need for high pressure seals, exhaust or metering valves, and resilient cushioning devices as provided in the known shock absorbers.

Still another object is to provide such a shock absorber arranged for effectively minimized turbulence in the shock absorbing fluid therein.

A further object is to provide such a shock absorber providing for free movement during a portion of the stroke and a controlled deceleration during another portion of the stroke.

A yet further object is to provide such a shock absorber arranged for selective omnidirectional installation.

Yet another object is to provide such a shock absorber which is extremely rugged yet having effectively minimized weight and size.

Still another object is to provide such a shock absorber comprising a new and improved self-contained unit.

Other features and advantages of the invention will be apparent from the following description taken in connection with the accompanying drawing wherein:

FIGURE 1 is a fragmentary side elevation of a shock absorber embodying the invention mounted in a suitable tubular support;

FIGURE 2 is a transverse section thereof taken substantially along the line 2—2 of FIGURE 1;

FIGURE 3 is a fragmentary diametric section taken substantially along the line 3—3 of FIGURE 1; and FIGURE 4 is a fragmentary diametric section of another form of shock absorber embodying the invention.

In the exemplary embodiment of the invention as disclosed in FIGURES 1–3 of the drawing, a high speed shock absorber generally designated 10 is shown to comprise a rigid member 11 defining a chamber 12 having an opening 13 through an outer surface 14 of the member 11, said chamber being filled with a body of fluid 15. A reaction member 16 is arranged to move, in response to a force to be absorbed, inwardly through the opening 13 into chamber 12. The reaction member 16 is arranged to have a clearance with the rigid member 11 in the opening 13 whereby the inward movement of the reaction member displaces the fluid 15 outwardly through the opening 13 circumjacent the reaction member.

As best seen in FIGURES 1 and 2, the rigid member 11 is coaxially mounted within a tubular support 17 by means of a ring 18 embracing an outer end 19 of the rigid member 11 and provided with a plurality of radially outwardly extending plates 20. The plates may be secured to the support 17 by suitable means such as welding for resisting the thrust of the force to be absorbed.

Extending coaxially inwardly from surface 14 of the rigid member 11, is a tubular enclosure 21, closed at its inner end by means of a thick closure plate 22. A second tubular enclosure 23 extends coaxially inwardly from closure plate 22 and is closed, in turn, at its outer end by a second closure plate 24. Suitable annular grooves 25, 26, 27 and 28, are provided in the rigid member 11, first closure plate 22, and second closure plate 24, respectively, for retaining the tubular enclosures against lateral translation, and a plurality of long bolts 29 is passed through the outer closure plate 24 to have threaded engagement with the rigid member 11 in suitable threaded openings 30 therein for securing the tubular enclosures and closure plates in coaxial association with rigid member 11.

As best seen in FIGURE 3, tubular enclosure 21 cooperates with the inner end of rigid member 11 and the first closure plate 22 to define a reservoir space 55 communicating through opening 13 with chamber 12. Fluid 15 herein comprises a suitable shock absorber liquid which completely fills chamber 12 and partially fills reservoir space 55 to provide an air space 31 in the upper portion of the reservoir space. Reaction members 16 is disposed, in a retracted position, within the reservoir space 55 adjacent to the first closure plate 22 and is secured to an outer end 32 of a rod 33 which is, in turn, connected at its inner end 34 to a coupling member 35 through which the force to be absorbed is transmitted to the rod 33, and thus to the reaction member 16. As shown in FIGURE 3, the closure plate 22 is provided with an axial bore 36 through which rod 33 extends for free axial movement. A seal, generally designated 37, is provided for sealing the rod to the closure plate 22 and herein comprises an annular flange packing 38 seated concentrically around the rod 33 axially between a metal pressure ring 39 and a bushing 40 retained in association with the closure plate 22 by a retaining ring 41 secured to the closure plate 22 by suitable means such as bolts 42. Thus, as the tubular enclosure 21 is sealed at its opposite ends to the rigid member 11 and closure plate 22 in the annular grooves 25 and 26, respectively, and the rod 33 is sealed to the closure plate 22, the reservoir space 30 is sealingly closed to have communication solely with chamber 12 through opening 13. Resultingly, when the rod 33 is moved to the right as seen in FIGURE 3, to move the reaction member 16 from the retracted position, shown in full lines, to the fully displaced position shown in dotted lines, the liquid displaced by the portion of the rod 33 then inserted within reservoir space 55 is displaced upwardly into air space 31. As this chamber is closed to the outside, the action of the rod 33 places the air in space 31 under substantial pressure. This pressure tends to urge the reaction member and rod back to the full line position of FIGURE 3, whereby the shock absorber is automatically self-resetting.

Where high friction loads are encountered, the air space 31 may be placed under positive pressure initially in order to achieve automatic self-resetting. Where self-resetting is undesirable the air space 31 may be suitably vented.

In certain installations, it is desirable to retain the rod 33 and reaction member 16 in the fully displaced position shown in dotted lines in FIGURE 3, and for this purpose plate 24 is arranged to define a portion of a chuck generally designated 43 including a plurality of jaws 44 carried on a flexible diaphragm 45, which jaws are cammed into locking engagement with the coupling 35 as shown in dotted lines when the rod and reaction member are in the fully displaced position. The mid-portion of the diaphragm 45 is selectively urged outwardly, or to the right as seen in FIGURE 3, by an annular piston 46 received in a piston chamber 47 within plate 24 and communicating through a passage 48 therein with a compressed air supply line 49. Thus, to release the rod and reaction member for return from the dotted line position to the full line position of FIGURE 3, air is delivered through passage 48 to chamber 47 to urge the piston 46 to the right as seen in FIGURE 3, and, thereby, disengage the jaws 44 from the coupling 35 permitting the air pressure within reservoir air space 31 to force the reaction member and rod to the left.

As best seen in FIGURE 3, the reaction member 16 comprises a rigid block including a forward end portion 50 and a rear portion 51. The forward portion is defined by a curve of revolution about the axis thereof, and the rear portion 51 defines a co-axial, forwardly narrowing frusto-conical portion. The rear portion 51 terminates rearwardly in a peripherally rounded rear end 52 and a planar rear surface 53 extending perpendicular to the axis of the reaction member and facially juxtaposed to the closure plate 22 when the reaction member is in the retracted position. The diameter of the frusto-conical portion 51 adjacent to the rear end 52 is preferably substantially equal to the diameter of opening 13 of rigid member 11. Thus, as the reaction member enters the chamber 12 through opening 13 its transverse size increases progressively until, when the reaction member is in the fully displaced dotted line position of FIGURE 3, the reaction member effectively closes the opening 13. During the movement of the reaction member through the opening, the forward portion of the reaction member displaces the shock absorber liquid from the chamber and causes it to flow through the opening circumjacent the reaction member to the reservoir space 55. The liquid flow is well controlled and free from excessive turbulence, and, as the annular space surrounding the reaction member 16 in opening 13 becomes smaller and smaller a progressively greater and greater resistance to the forward movement of the reaction member is produced, thereby completely absorbing the force transmitted from the coupling 35 through the rod 33 to the reaction member. It should be noted, that the pressure increase in the reservoir space 55 is due only to the displacement of the liquid in the reservoir space by the forward portion 32 of the rod 33 moved into the reservoir space and that the increasing pressure differential between the liquid in the chamber 12 and the liquid in the reservoir space 55 as the reaction member 16 moves into the chamber 12 is localized at opening 13 thereby obviating the need for high pressure seals in the shock absorber. Further, as the initial movement of the reaction member 16 from the full line position to the point where the forward portion 50 first enters the opening 13 is substantially unrestricted, a substantially free movement of the coupling member 35 is provided followed by a controlled deceleration thereof as the reaction member progresses into chamber 12. It should be noted further that the use of resilient cushioning means of the conventional shock absorbers is completely obviated substantially simplifying the structure of the shock absorber, assuring consistent faultless action, and reducing the cost thereof. As the shock absorbing forces produced in the shock absorber liquid 15 are directed against the rugged rigid member 11 and reaction member 16, the shock absorber 10 is capable of absorbing extremely high forces.

Still further, it should be noted that while the invention has been illustrated with the axis of the shock absorber extending horizontally, the shock absorber may be installed in any position wherein the chamber 12 is below the liquid level. As shown, the shock absorber 10 comprises a self-contained unit permitting facilitated installation in relatively inaccessible locations and is particularly well suited for use in inaccessible locations by virtue of its substantially maintenance-free, fool-proof functioning.

Referring now more specifically to FIGURE 4, a modified shock absorber generally designated 110 comprises a shock absorber generally similar to shock absorber 10 except for a reversal of the cylindrical-tapered relationship of the reaction member and chamber. More specifically, in shock absorber 110, the reaction member 116 comprises a rigid block including a forward end portion 150 generally similar to forward portion 50 of reaction member 16. Rearwardly of forward portion 150, the reaction member 116 is defined by a cylindrical portion 151. The rigid member 111 of shock absorber 110 defines a chamber 112 having an opening 113 through the rear surface 114 thereof. Chamber 112 is frusto-conical widening toward surface 114 and at the forward end or right-hand end as seen in FIGURE 4, opens into a stepped recess 154 arranged to accommodate the forward portion 150 of the reaction member 116 at the forward end of the reaction member's stroke as shown by dotted lines in FIGURE 4. The recess 154 is defined in part by a frusto-conical surface 155 facially engaged by the reaction member portion 150 at the limit of the stroke to serve as a positive limit to the reaction member movement. The chamber 112 is further defined by a substantially cylindrical portion 156 rearwardly adjacent surface 155, and having a diameter substantially equal to the diameter of reaction member portion 151 for accurate fit of said portion 151 therein at the forward end of the reaction member stroke. As in shock absorber 10, a tubular enclosure 121 is associated with the rigid member to cooperate therewith in defining a reservoir for holding a body of fluid 115 for absorbing the forces generated.

Shock absorber 110 provides an improved functioning wherein wear of the rigid member surface defining chamber 112 is distributed along substantially the total length thereof. Further, the distance that the fluid 115 must travel to the reservoir from the high pressure area between the reaction member and chamber wall increases as the reaction member moves forwardly into the chamber, thus providing improved dispersion of the resultant fluid jet in the body of fluid within enclosure 121. Thus, the inertia of the fluid is effectively minimized. Still further, the cooperating structures of the reaction member and rigid member chamber are such that when the reaction member bottoms therein, i.e. forward portion 150 seats on surface 155, an effectively minimum volume of fluid is disposed forwardly of the reaction member in recess 154 and the forward end of chamber 112 thereby effectively minimizing any tendency of the reaction member to bounce.

Shock absorber 110 has the additional advantages of reduced mass and, therefore, inertia of the reaction member, and reduction in over-all length and weight of the entire shock absorber. Thus, the cost of the shock absorber is effectively minimized, and installation thereof is substantially simplified. Except as discussed above, shock absorber 110 is similar to and functions similar to shock absorber 10.

While I have shown and described certain embodiments of my invention, it is to be understood that it is capable of many modifications. Changes, therefore, in the construction and arrangement may be made with departing from the spirit and scope of the invention as defined in the appended claims.

I claim:

1. A shock absorber comprising: a rigid member defining a chamber having an opening through an outer surface of the member; a body of fluid filling said chamber; and a reaction member responsive to a force to be absorbed to move inwardly through said opening into said chamber, said reaction member having a tapered nose having clearance with said rigid member in said opening during movement of said reaction member into said chamber whereby the inward movement of said reaction member displaces said fluid outwardly through said opening circumjacent the reaction member, said rigid member further having a wall portion defining a tapered inner end of said chamber, said nose of the reaction member seating on said wall portion and said reaction member being arranged to close said clearance substantially only concurrently with the seating of said reaction member on said wall portion to limit the inward movement of said reaction member into said chamber.

2. A shock absorber comprising: a rigid member defining a chamber having an opening through an outer surface of the member; a body of fluid filling said chamber; a reaction member responsive to a force to be absorbed to move inwardly through said opening into said chamber, said reaction member having clearance with said rigid member in said opening whereby the inward movement thereof displaces said fluid outwardly through said opening circumjacent the reaction member; an enclosure defining a reservoir communicating with said chamber through said opening; a rod extending axially movably through a portion of the enclosure and carrying said reaction member on its inner end; means sealing the enclosure to the rigid member; and means sealing the rod to said enclosure portion whereby said chamber is hydraulically closed to atmosphere and movement of the rod axially into the enclosure produces a pressure within the enclosure and chamber urging the rod outwardly therefrom.

3. The shock absorber of claim 2 wherein said chamber includes a gas filled space in the upper portion thereof.

4. The shock absorber of claim 2 wherein said reaction member has a length less than the depth of said chamber.

5. A shock absorber comprising: a rigid member defining a chamber having a closed inner end and an opening through an outer surface of the member; a body of fluid filling said chamber; a reaction member responsive to a force to be absorbed to move inwardly through said opening into said chamber, said reaction member having clearance with said rigid member in said opening whereby the inward movement thereof displaces said fluid outwardly through said opening circumjacent the reaction member; an enclosure defining a reservoir communicating with said chamber through said opening; a rod extending axially movably through a portion of the enclosure and carrying said reaction member on its inner end; means sealing the enclosure to the rigid member; means sealing the rod to said enclosure portion whereby said chamber is hydraulically closed to atmosphere and movement of the rod axially into the enclosure produces a pressure within the enclosure and chamber urging the rod outwardly therefrom; and means releasably retaining the reaction member against movement from the chamber.

6. A shock absorber comprising: a rigid member defining a chamber having an opening through an outer surface of the member; a body of fluid filling said chamber; a reaction member responsive to a force to be absorbed to move forwardly through said opening into said chamber, said reaction member having a tapered nose and having clearance with said rigid member in said opening during movement of said reaction member into said chamber whereby the forward movement thereof displaces said fluid outwardly through said opening circumjacent the reaction member; and a reservoir adjacent said opening, for selectively receiving fluid from and delivering fluid to said chamber through said opening, said rigid member chamber having a rearward portion and said reaction member having a forward portion, one of said portions increasing progressively in transverse size in a rearward direction, said rigid member further having a wall portion defining a tapered inner end of said chamber, said nose of the reaction member seating on said wall portion and said reaction member being arranged to close said clearance substantially only concurrently with the seating of said reaction member on said wall portion to limit the inward movement of said reaction member into said chamber.

7. A shock absorber comprising: a rigid member defining a chamber having an opening through an outer surface of the member; a body of fluid filling said chamber; and a reaction member having a cylindrical portion and a tapered nose, said reaction member being responsive to a force to be absorbed to move said reaction member forwardly through said opening into said chamber, said reaction member having clearance with said rigid member in said opening during movement of said reaction member into said chamber whereby the forward movement thereof displaces said fluid outwardly through said opening circumjacent the reaction member, said rigid member chamber having a rearwardly opening portion increasing progressively in transverse size in a rearward direction, said rigid member further having a wall portion defining a tapered inner end of said chamber, said nose of the reaction member seating on said wall portion and said reaction member being arranged to close said clearance substantially only concurrently with the seating of said reaction member on said wall portion to limit the inward movement of said reaction member into said chamber.

8. The shock absorber of claim 7 wherein said rigid memebr further defines a recess extending axially forwardly from the tapered wall portion of the chamber for receiving the forward end of the reaction member.

9. The shock absorber of claim 8 wherein said wall portion is defined in part by a frusto-conical rearwardly widening surface for selective facial engagement by the forward portion of the reaction member when the reaction member is at the forward end of its stroke.

10. A shock absorber comprising: a rigid member defining a chamber having an opening through an outer surface of the member; a body of fluid filling said chamber; a reaction member responsive to a force to be absorbed to move inwardly through said opening into said chamber, said reaction member having clearance with said rigid member in said opening whereby the inward movement thereof displaces said fluid outwardly through said opening circumjacent the reaction member; an enclosure defining a reservoir communicating with said chamber through said opening; means extending axially movably through a portion of the enclosure and carrying said reaction member on its inner end; means sealing the enclosure to the rigid member; means sealing the member-carrying means to said enclosure portion whereby said chamber is hydraulically closed to atmosphere and movement of the member-carrying means axially into the enclosure produces a pressure within the enclosure and chamber urging the member-carrying means outwardly therefrom; and means releasably retaining the reaction member against movement from the chamber.

References Cited in the file of this patent

UNITED STATES PATENTS

| | | |
|---|---|---|
| 731,116 | Myer | June 16, 1903 |
| 2,826,273 | Mitchell | Mar. 11, 1958 |
| 2,846,029 | Cawley | Aug. 5, 1958 |
| 2,857,890 | Stott | Oct. 28, 1958 |
| 2,960,192 | Schwinge | Nov. 15, 1960 |

FOREIGN PATENTS

| | | |
|---|---|---|
| 262,354 | Germany | July 11, 1913 |
| 649,180 | Great Britain | Jan. 17, 1951 |
| 655,030 | Great Britain | July 4, 1951 |
| 86,652 | Netherlands | Nov. 15, 1957 |